(12) United States Patent
Ross

(10) Patent No.: US 9,249,577 B2
(45) Date of Patent: Feb. 2, 2016

(54) CABLE RAILING

(71) Applicant: George H. Ross, Delano, MN (US)

(72) Inventor: George H. Ross, Delano, MN (US)

( * ) Notice: Subject to any disclaimer, the term of this patent is extended or adjusted under 35 U.S.C. 154(b) by 188 days.

(21) Appl. No.: 13/680,052

(22) Filed: Nov. 17, 2012

(65) Prior Publication Data
US 2014/0138596 A1 May 22, 2014

(51) Int. Cl.
| | | |
|---|---|---|
| E04H 17/02 | (2006.01) | |
| E04F 11/18 | (2006.01) | |
| E04H 17/10 | (2006.01) | |
| F16G 11/12 | (2006.01) | |
| F16G 11/04 | (2006.01) | |

(52) U.S. Cl.
CPC ............ *E04F 11/1859* (2013.01); *E04H 17/10* (2013.01); *F16G 11/04* (2013.01); *F16G 11/12* (2013.01); *Y10T 403/7064* (2015.01)

(58) Field of Classification Search
CPC .................................................. E04F 11/1859
USPC ............ 254/231–234; 256/32, 37, 39, 40, 43, 256/46, 47, 56; 24/115 M; 403/367, 374.1; 52/223.13, 223.14
See application file for complete search history.

(56) References Cited

U.S. PATENT DOCUMENTS

| | | | | |
|---|---|---|---|---|
| 2,463,144 | A | * 3/1949 | Buchanan | ...................... 439/805 |
| 3,439,898 | A | * 4/1969 | Cleveland et al. | ............... 256/39 |
| 3,895,879 | A | * 7/1975 | Burtelson | ...................... 403/369 |
| 4,074,945 | A | 2/1978 | Kraus et al. | |
| 4,266,756 | A | * 5/1981 | Anderson | ........................ 256/47 |
| 4,293,178 | A | * 10/1981 | Lee | ................................ 439/462 |
| 4,316,307 | A | 2/1982 | Hurst | |
| 4,354,799 | A | 10/1982 | Hurst | |
| 4,428,100 | A | * 1/1984 | Apperson | .................... 24/115 R |
| 4,493,134 | A | 1/1985 | Karr | |
| 4,517,408 | A | 5/1985 | Pegram | |
| 4,671,695 | A | * 6/1987 | Scotti | .............................. 403/213 |
| 4,738,155 | A | * 4/1988 | Stocker | ......................... 74/502.6 |
| 4,899,499 | A | * 2/1990 | Hoekstra | .......................... 52/146 |
| 5,116,178 | A | 5/1992 | Lerman et al. | |
| 5,409,330 | A | 4/1995 | Naines et al. | |
| 5,594,977 | A | * 1/1997 | McCallion | .................. 24/136 B |
| 6,053,281 | A | 4/2000 | Murray | |
| D423,913 | S | 5/2000 | Dougan, Jr. | |
| 6,135,424 | A | 10/2000 | Bracke | |
| 6,176,051 | B1 | * 1/2001 | Sorkin | ......................... 52/223.13 |
| 6,190,085 | B1 | 2/2001 | Johansson | |
| 6,547,223 | B1 | 4/2003 | Letourneau | |
| 6,679,480 | B1 | * 1/2004 | Hara et al. | ....................... 256/47 |
| 6,733,203 | B2 | * 5/2004 | Carlsen et al. | ................. 403/365 |
| 6,860,472 | B2 | 3/2005 | Striebel et al. | |
| 7,043,801 | B2 | * 5/2006 | Toimil | ......................... 24/136 R |
| 7,044,450 | B2 | 5/2006 | Striebel et al. | |
| 7,198,253 | B2 | 4/2007 | Striebel et al. | |
| 7,231,957 | B2 | 6/2007 | Gregory et al. | |
| 7,287,728 | B2 | * 10/2007 | Shuey | .............................. 248/72 |

(Continued)

*Primary Examiner* — Daniel P Stodola
*Assistant Examiner* — Matthew R McMahon
(74) *Attorney, Agent, or Firm* — Antonio Papageorgiou, Esq.; Meister Seelig & Fein LLP

(57) ABSTRACT

A cable railing is provided that includes two or more vertical members secured to a surface with a base plate having a horizontal member and two or more holes to affix two or more receiving inserts containing at least one spring, a retainer cap, at least a pair of wedge locks and a receiving insert, one adjustable in a clockwise rotation the second adjustable in a counter clockwise rotation to secure and draw one or more cables taught by a tightening apparatus to enclose decks, balconies, walkways, stairways and other areas.

13 Claims, 14 Drawing Sheets

(56) References Cited

U.S. PATENT DOCUMENTS

| | | |
|---|---|---|
| 7,367,090 B2 | 5/2008 | Huffman et al. |
| 7,441,751 B1 | 10/2008 | Gibbs |
| D581,869 S | 12/2008 | Zenk |
| 7,472,502 B2 | 1/2009 | Gregory et al. |
| 7,475,868 B1 | 1/2009 | Gibbs |
| 7,478,799 B2 | 1/2009 | Viviano |
| 7,500,654 B2 | 3/2009 | Rosaen |
| D591,679 S | 5/2009 | Zenk |
| 7,913,983 B1 * | 3/2011 | Sandor, Sr. ............... 256/67 |
| RE43,194 E | 2/2012 | Toimil |
| 8,266,803 B2 * | 9/2012 | Neusch .................. 29/897.3 |
| 8,276,334 B2 * | 10/2012 | Mathews et al. ......... 52/223.13 |
| 8,286,309 B2 * | 10/2012 | Landry .................. 24/136 B |
| 8,720,302 B2 * | 5/2014 | Foster et al. ............. 74/502.4 |
| 8,727,287 B2 * | 5/2014 | Trouve et al. ............... 248/56 |
| 2003/0006405 A1 | 1/2003 | Striebel et al. |
| 2005/0230076 A1 | 10/2005 | Gregory et al. |
| 2005/0251972 A1 | 11/2005 | Gregory et al. |
| 2007/0119562 A1 | 5/2007 | Gregory et al. |
| 2011/0084180 A1 * | 4/2011 | Toimil et al. ............. 248/74.2 |
| 2012/0034025 A1 | 2/2012 | Wahlberg et al. |
| 2012/0256059 A1 | 10/2012 | Toimil et al. |
| 2013/0087753 A1 * | 4/2013 | Landry ..................... 256/47 |

\* cited by examiner

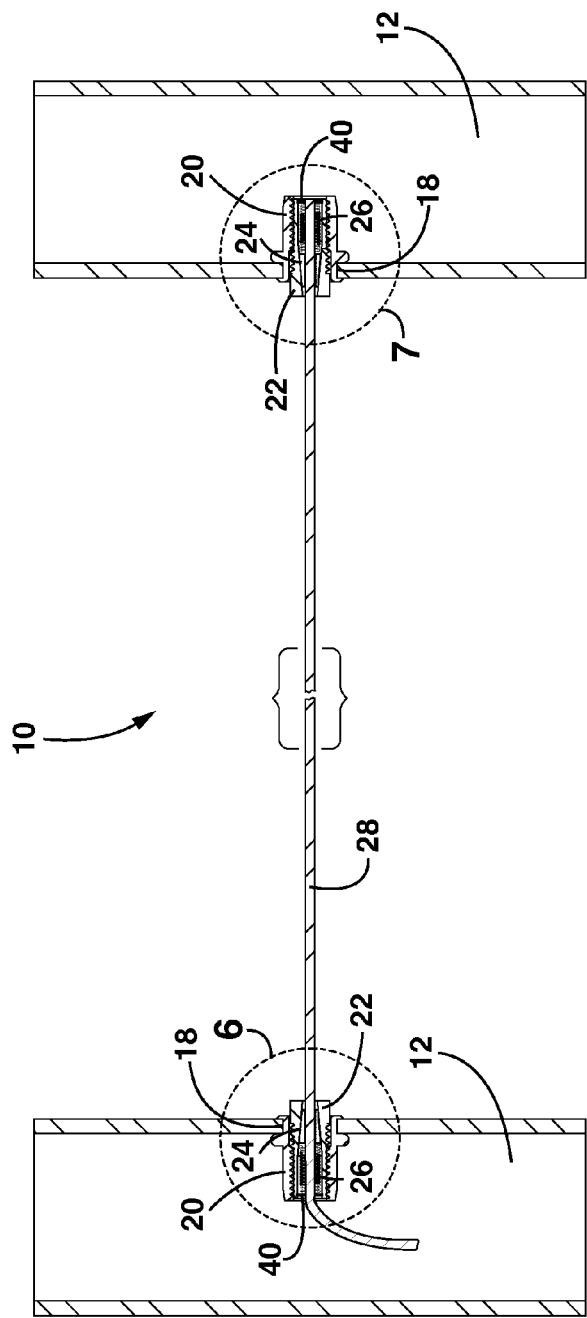
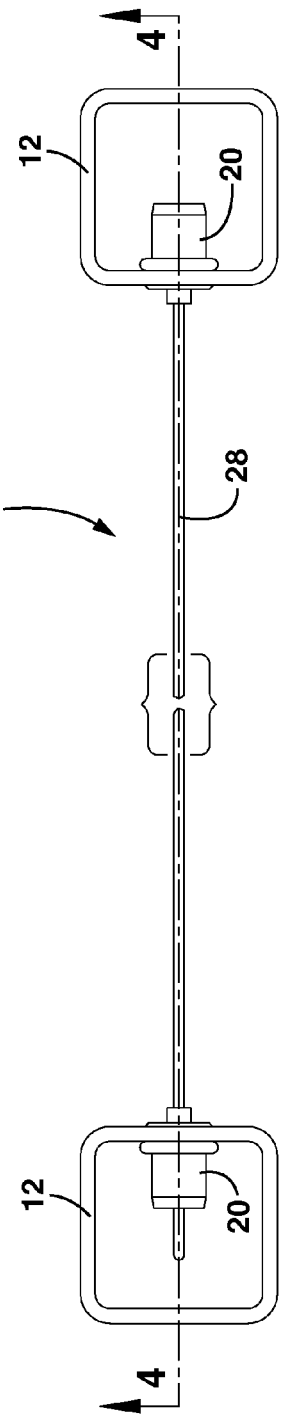
FIG. 4
FIG. 5

CABLE RAILING

BACKGROUND OF THE INVENTION

The present application relates to railing systems, in particular to cable railing systems for use in commercial and residential settings, for example, to enclose decks, balconies, walkways, stairways and the like.

Cable railing, often chosen for a clean unobtrusive look, is used in both interior and exterior applications. Cable railing generally has less material to obstruct a view than other forms of railing. A drawback, however, is that the fasteners and turnbuckles that are required to tighten the cable rail are exposed. In addition to presenting an industrial look and feel to the cable railing, which may not always be desired or appropriate, these exposed elements are prone to being tampered with and may result in injury.

Various other materials, such as glass, have been used to produce a clean unobtrusive look to enclose decks, balconies, walkways and stairways. Glass however is a high maintenance solution requiring constant washing to keep it clean and thus not a ideal solution to overcome the problems associated with traditional cable railing systems.

Accordingly there is a need for cable railing which overcomes the limitations of railing systems noted above.

SUMMARY OF THE INVENTION

In one aspect, a railing system is provided that includes a pair of vertical members; a pair of cable receiving assemblies, each cable receiving assembly attached to one of the pair of vertical members and having a cavity therein with an outwardly facing opening for receiving a cable; and a cable having opposed ends, wherein each of the opposed ends inserted is into an outwardly facing opening and terminated in one of the pair of cable receiving assemblies.

In one embodiment, at least one of the pair of cable receiving assemblies includes a tubular receiving insert having inner threads therein, a tubular threaded insert threaded into the receiving insert, the threaded insert having a tapered inner surface, and at least two wedge locks inserted within the threaded insert, each of the wedge locks having a tapered outside surface that acts against the tapered inner surface of the threaded insert and at least one tension surface that clamps onto the cable inserted within the assembly.

In one embodiment, the receiving insert is affixed to a hole in a vertical member.

In one embodiment, at least one of the receiving insert and the threaded insert fit essentially flush within an outer surface of the vertical member.

In one embodiment, the at least one cable receiving assembly includes a spring that pushes the at least two wedge locks outward. The spring may be a coil spring and the cable may be located within the coil spring.

In one embodiment, threading the threaded insert increases a tension in the cable.

In one embodiment, at least one of the pair of cable receiving assemblies includes a tubular receiving insert having inner threads therein, a tubular threaded insert threaded into the receiving insert, the threaded insert having a tapered inner surface, and at least two wedge locks inserted within the threaded insert, each of the wedge locks having a spherical shape that acts against the tapered inner surface of the threaded insert to clamp onto the cable inserted within the assembly.

In one embodiment, each of the pair of cable receiving assemblies includes a tubular receiving insert having inner threads therein, a tubular threaded insert threaded into the receiving insert, the threaded insert having a tapered inner surface, and at least two wedge locks inserted within the threaded insert, each of the wedge locks having a tapered outside surface that acts against the tapered inner surface of the threaded insert and at least one tension surface that clamps onto the cable inserted within the assembly, and wherein the threads of the receiving member of one of the assemblies is opposite the threads of the receiving member of another of the assemblies.

In one embodiment, each cable receiving assembly includes a spring that pushes the at least two wedge locks outward. The spring may be a coil spring and the cable may be located within the coil spring.

Additional aspects of the present invention will be apparent in view of the description which follows.

BRIEF DESCRIPTION OF THE FIGURES

FIG. 4 is a front view of FIG. 3.

FIG. 5 is a top view of FIG. 4.

DETAILED DESCRIPTION OF THE INVENTION

Figure 1:
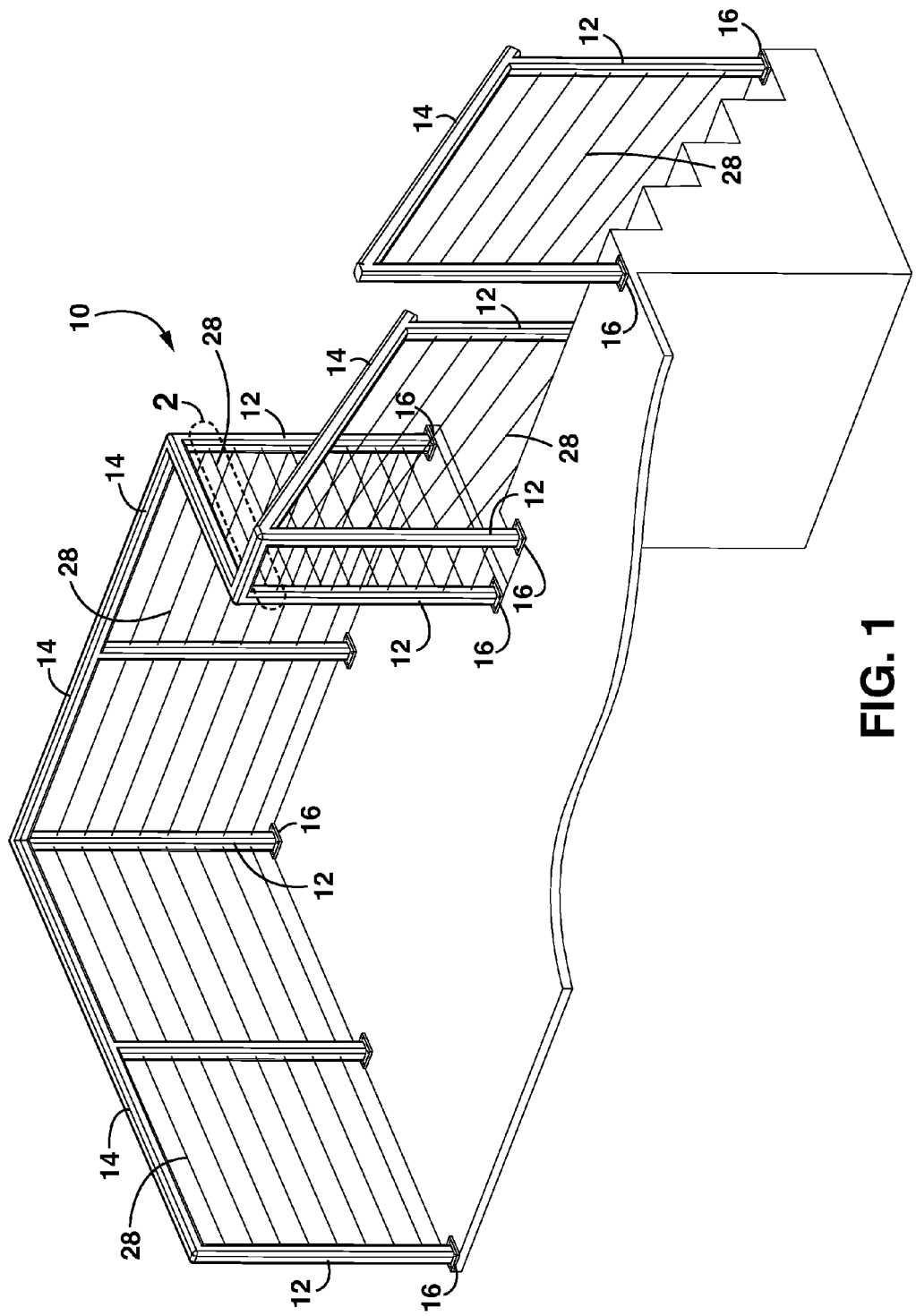
FIG. 1 is a perspective view of one embodiment of the cable railing in use.

Referring to FIG. 1 a perspective view of one embodiment of the cable railing system 10 in use. FIG. 1 illustrates one of many possible configurations of cable railing system 10 to surround a perimeter of a deck, balcony and/or to enclose the sides of a stairway. The system generally includes two or more vertical members or posts 12, at least one horizontal member 14, such as a handrail, extending between vertical members 12, and one or more cables 28, also extending between vertical members 12, for a typical installation. Vertical members 12 are secured to a surface by fasteners extending through base plates 16. As can be seen, the railing system 10 provides a very clean look, without exposed fasteners and turnbuckles. Further, cable railing 10 is safer because there are no exposed fasteners or turnbuckles for fingers to get caught in or hands to get, inadvertently, cut by. Another advantage is a more precise installation. A cable railing system 10 can be pre-manufactured to size and does not depend on stretching cables through a field installed post system.

The cable railing 10 system is preferably pre-manufactured from information provided by field or design measurements. In this instance, vertical members 12, horizontal members 14, base plates 16 and cables 28 are fabricated in a manufacturing facility. In particular, another advantage of the cable railing 10 system is that vertical members 12, having been cut to length with base plates 16 welded in place, are at this time also fitted with holes 18, receiving inserts 20, wedge locks 24, springs 26 and the other related components. If need be the cable railing 10 system can be completely set up in the fabricating facility to check against field or design measurements.

Figure 2:
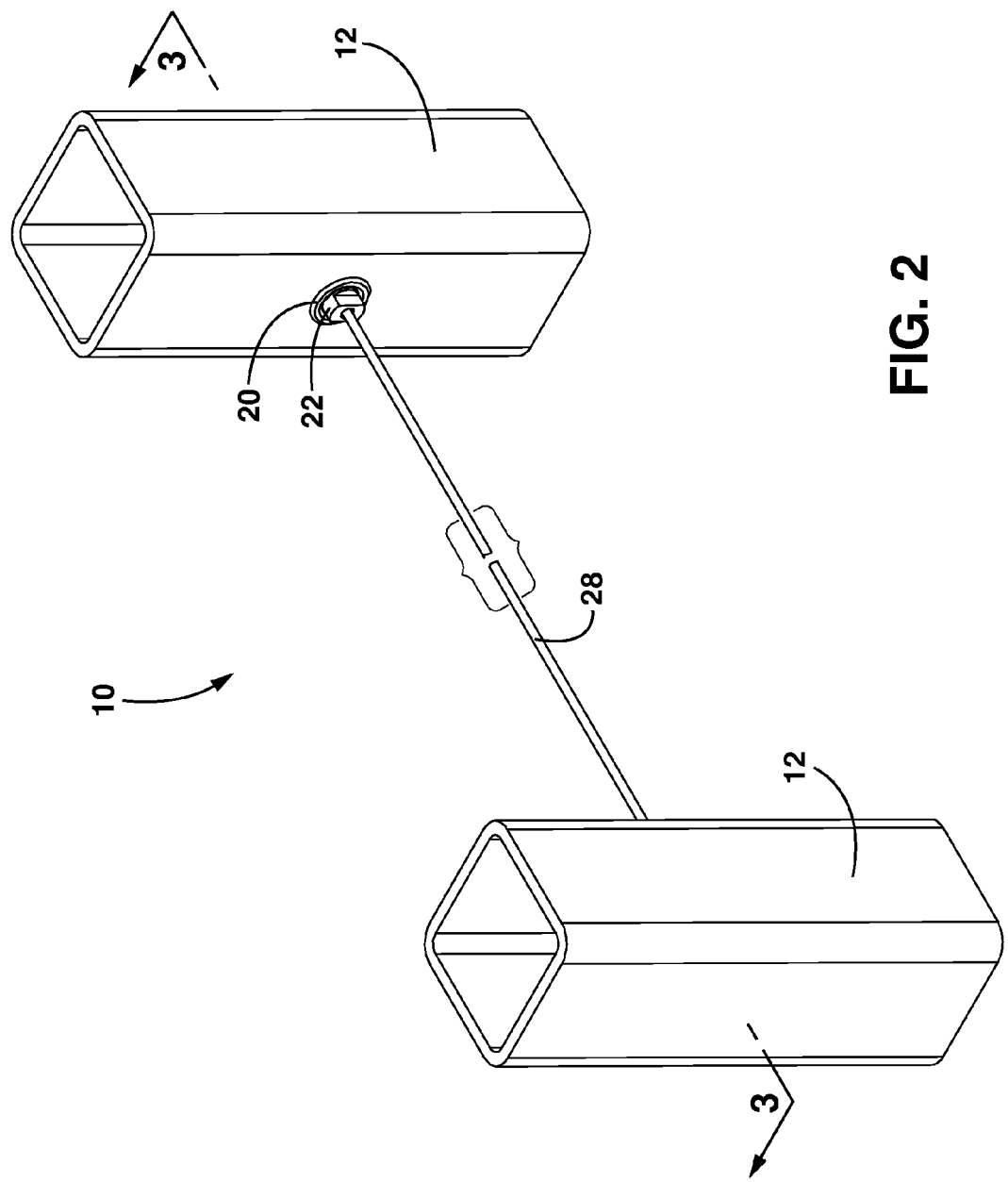
FIG. 2 is a detail perspective view taken from FIG. 1.
Figure 3:
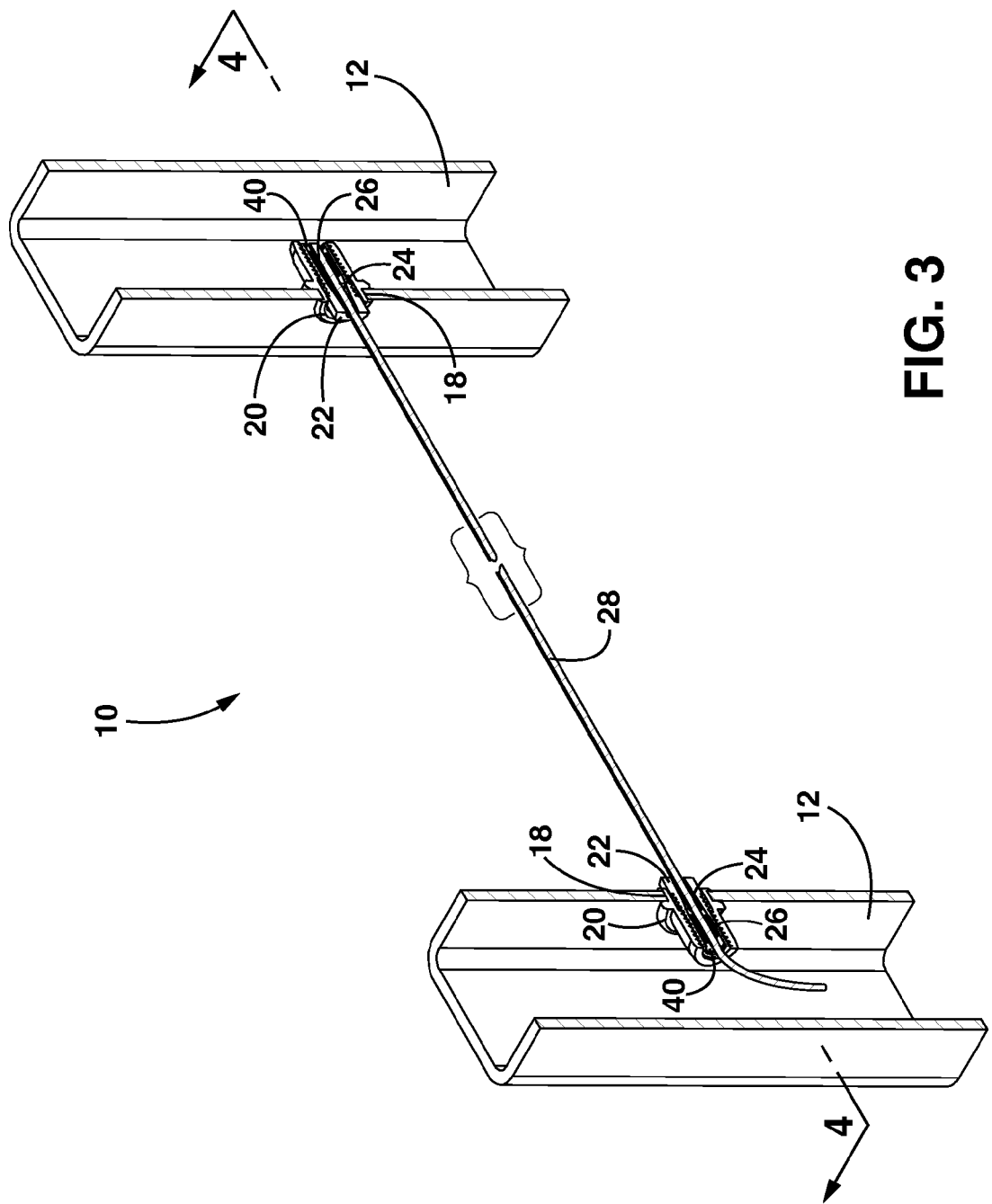
FIG. 3 is a section view taken from FIG. 2.
Figure 7:
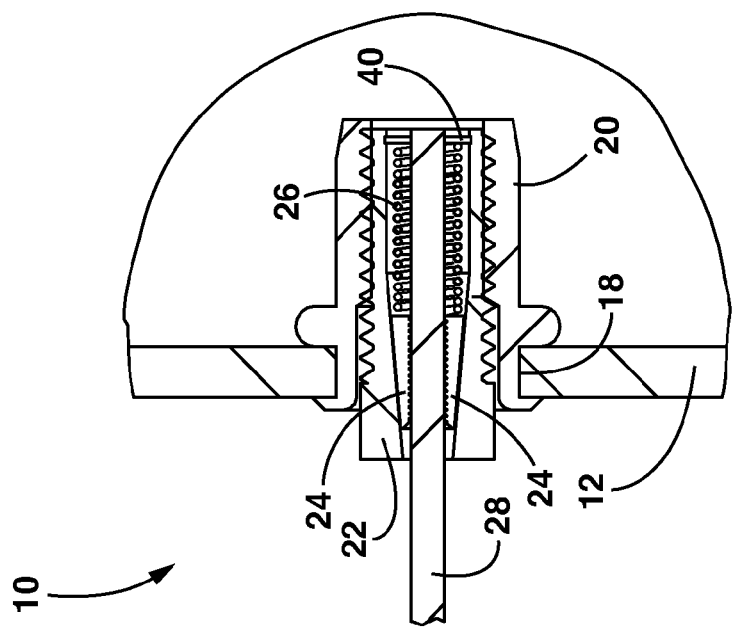
FIG. 7 is a detail view taken from FIG. 4.
Figure 6:
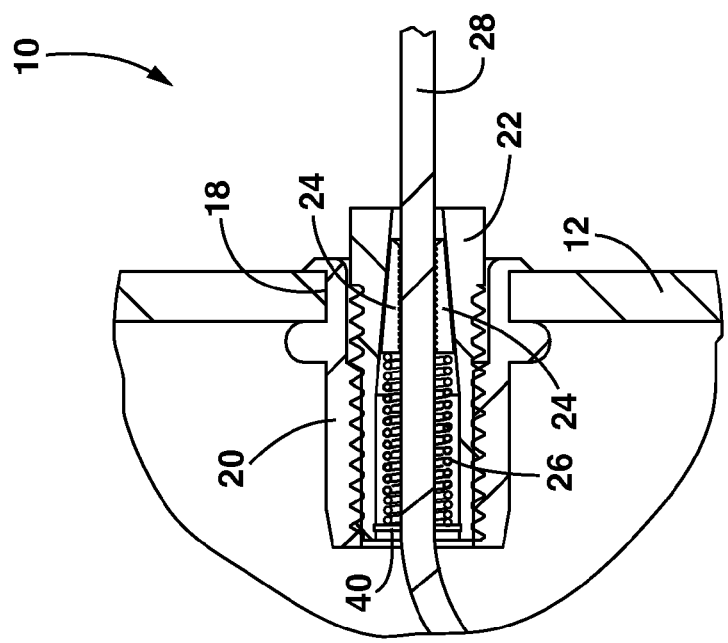
FIG. 6 is a detail view taken from FIG. 4.
Figure 9:
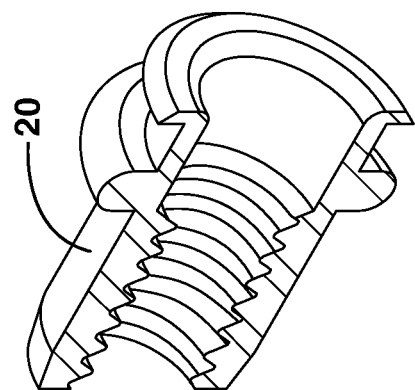
FIG. 9 is a perspective section view taken from FIG. 8.

Referring now to FIG. 2 through FIG. 8. FIG. 2 is a detail perspective view taken from FIG. 1. FIG. 3 is a section view taken from FIG. 2. FIG. 4 is a front view of FIG. 3. FIG. 5 is a top view of FIG. 4. FIG. 6 is a detail view taken from FIG. 4. FIG. 9 is a detail view taken from FIG. 4. In one embodiment, the vertical members 12 are constructed from 2 inch by 2 inch tube steel and can be any length. A base plate 16 is welded to the bottom end of the vertical member 12. One or more holes 18 are drilled through each vertical member 12 so that at least one pair of holes are facing each other. The holes 18 may be approximately 0.75 inches in diameter and spaced incrementally in a vertical direction. In most instances, the vertical dimension between hole-centers may be from about 3 inches to about 4 inches. The holes 18 in the vertical member 12 accommodate the insertion of a cable receiving assembly, which includes receiving insert 20, a threaded insert 22, a spring 26, and a plurality of wedge locks 24. The receiving assembly is attached to the vertical members 12 by first inserting the receiving insert 20 into each of the holes 18. After insertion the insert 20 into the hole 18, the receiving insert 20 is permanently affixed, in hole 18, for example, using a setting tool which expands the outside portion of the receiving insert 20 to securely attach the insert 20 against the inside and outside surfaces of the wall of the vertical member 12, as shown.

Assembly is continued by inserting at least two wedge locks 24 and one spring 26 into the hollow cavity of threaded insert 22. Threaded insert 22 is then joined with the inside thread of receiving insert 22 and tightened to securely engage threaded insert 22 and receiving insert 20 for transportation, of the prefabricated cable railing 10 assembly, to the installation location. The spring 26 acts against the receiving insert 20 and/or the threaded insert at the inner end of the assembly, retainer cap 40, and against the inner end of the wedge lock 24, thus pushing the wedge lock 24 outwardly.

Retainer cap 40 may be constructed of 24 gauge steel in a circular fashion with an approximate inside diameter of about 0.225 inches and an outside diameter of approximately 0.305 inches. Four radii of approximately 0.035 inches are positioned at the quarter points of the circle. The retainer cap 40 is press fit into the end of threaded insert 22 to hold the spring 26 against wedge lock 24. The approximate overall dimension of retainer cap 40 may be a reference circle of about 0.320 inches.

At the installation location, the vertical members 12 are secured to a surface by fasteners extending through base plates 16. Horizontal members 14 are installed at the top end of vertical members 12. Next, the cut to size, cable 28 lengths are installed into the access holes at the inside facing ends of threaded inserts 22. Cable 28, in one embodiment, is constructed of 0.125 stainless steel 1×19 braded wire. Any slack in the cable 28 is removed by hand and the cable 28 is drawn taught by turning one threaded insert 22 in a clockwise rotation 32 and the opposite threaded insert 22 in a counter clockwise rotation 34. In both these instances the spring 26 is integrally engaged on the inside of threaded insert 22 and serves to tension a pair of wedge locks 24 in their appropriate place inside threaded insert 22. As threaded insert 22 is tightened, the pair of wedge locks 24 are put under pressure to secure the cable 28 by biting into the surface of cable 28 as cable 28 is drawn taught by the rotational tightening of threaded insert 22.

It should be further noted that cable 28 can be cut to size to have its cable 28 ends contained by the cable receiving assembly. Also cable 28 can be cut with an overage of material. The cable receiving assembly, being open to the back, allows extra cable 28 to exit the back of the cable receiving assembly. Thus another advantage is cable 28 ends are contained in the vertical members 12 cavity, making field trimming of cable 28 unnecessary.

Figure 8:
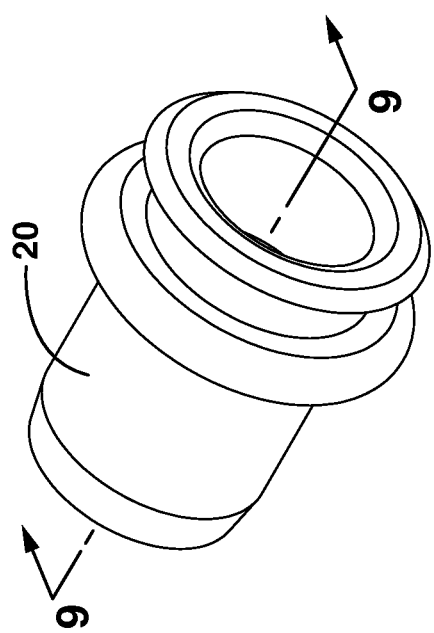
FIG. 8 is a perspective view of the compressed receiving insert.

FIG. 8 is a perspective view of an expanded receiving insert 20 and FIG. 9 is a perspective cross section view taken from FIG. 8. Receiving insert 20, in one embodiment, is constructed from 304 or 316 stainless steel with an approximate outside diameter of about 0.68 inches and approximate length of about 1.2 inches. The exposed flange has an approximate diameter of 0.835 inches. The receiving inserts 20 are manufactured in pairs. One receiving insert 20 has an inside ½-13 right hand machined thread while the other of receiving insert 20 of the pair has a inside ½-13 left hand machined thread.

Figure 11:
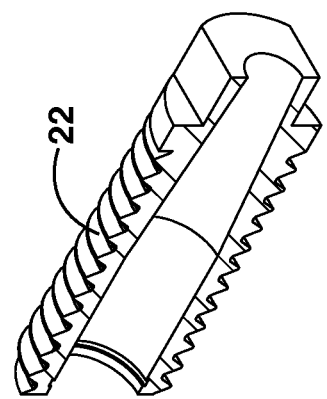
FIG. 11 is a perspective section view taken from FIG. 10.
Figure 10:
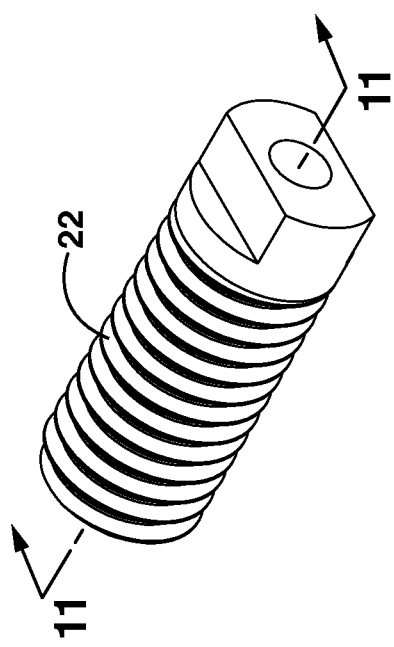
FIG. 10 is a perspective view of the threaded insert.

FIG. 10 is a perspective view of the threaded insert 22. FIG. 11 is a perspective cross section view taken from FIG. 10. Threaded insert 22, in one embodiment, is constructed from ½-13 threaded rod with an approximate outside diameter of about 0.5 inches and approximate length of about 1.24 inches. The insert 22 has a central cavity extending the length of the insert 22. The cavity has tapered diameter, which tapers from about 0.188 inches at the outward facing access hole (that receives the cable) to about 0.326 inches at the inward facing access hole. The threaded insert 22 includes a head to accommodate a tightening means 30 or any other hand tool, such as a wrench or pliers, for threading the threaded insert 22 into the receiving insert 20. The head has approximate dimensions of about 0.3 inches by about 0.5 inches and is configured as a cylinder, with material removed, to create two opposite planer sides. The depth of the head is about 0.188 inches.

Figure 13:
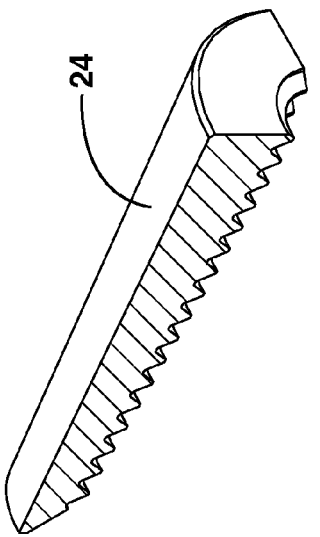
FIG. 13 is a perspective section view taken from FIG. 12.
Figure 12:
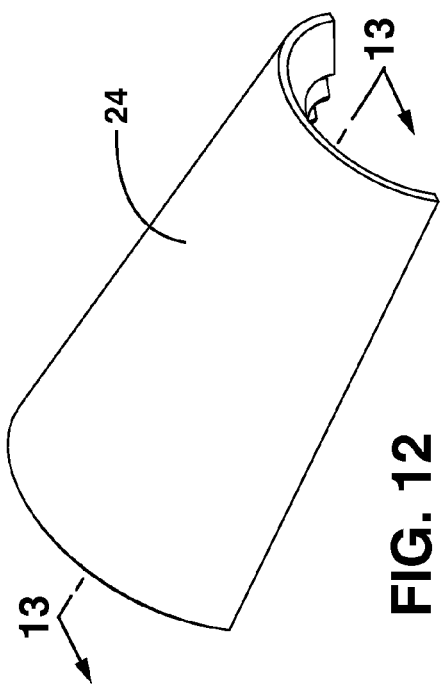
FIG. 12 is a perspective view of the wedge lock.
Figure 14:
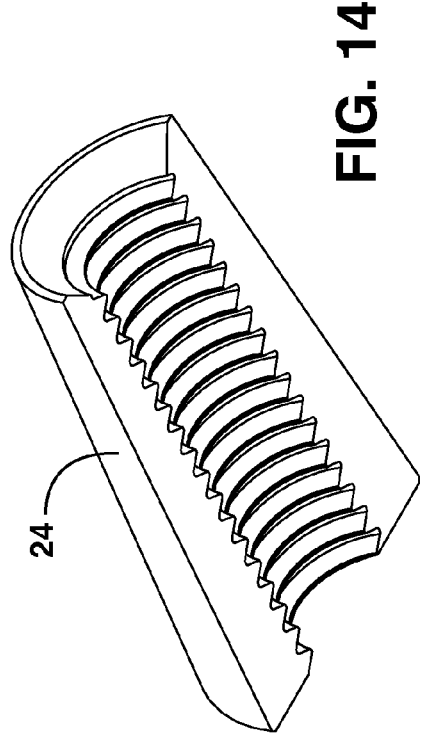
FIG. 14 is a perspective bottom view of the wedge lock.

FIG. 12 is a perspective view of the wedge lock 24. FIG. 13 is a perspective cross section view taken from FIG. 12. FIG. 14 is a perspective bottom view of the wedge lock 24. Wedge lock 24, in one embodiment, is constructed from ASTM A 108 standard screw stock or similar with a zinc finish and has an approximate width, at its narrow end, of about 0.2 inches and an approximate width at its wide end of about 0.271 inches. The wedge lock 24 therefore has an outside surface that tapers outwardly. The approximate height of the wedge lock 24 is about 0.121 inches. The approximate diameter of the M3.5×0.6 machine thread in the inside surface of the wedge lock 24 is 0.117 inches.

Figure 16:
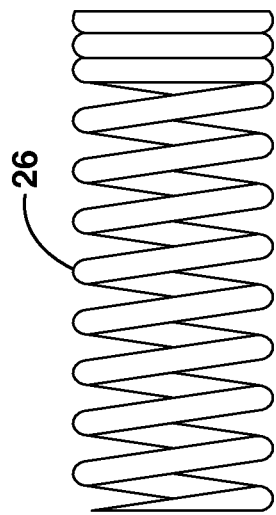
FIG. 16 is a side elevation view taken from FIG. 15.
Figure 15:
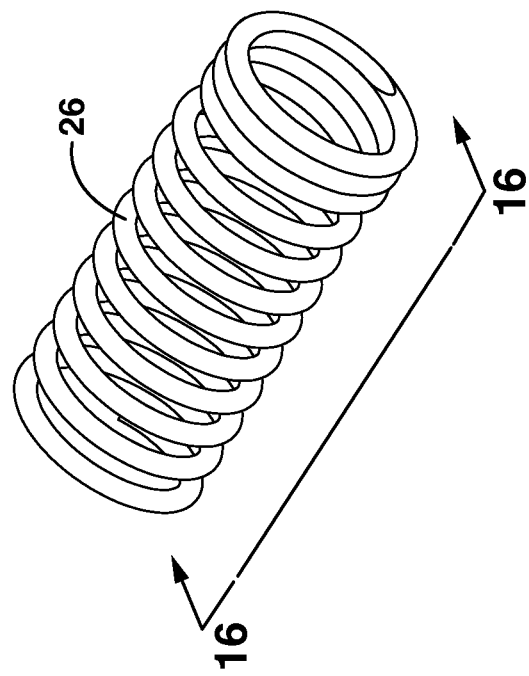
FIG. 15 is a perspective view of the spring.

FIG. 15 is a perspective view of the spring 26. FIG. 16 is a side elevation view taken from FIG. 15. Spring 26, in one embodiment, is constructed from about 0.026 wire with a constant pitch of about 0.05 inches in a clockwise direction of 9 revolutions with a height of about 0.445 inches. The spring 26 may have three loops with no gaps at one end and is ground flat at that end.

Figure 17:
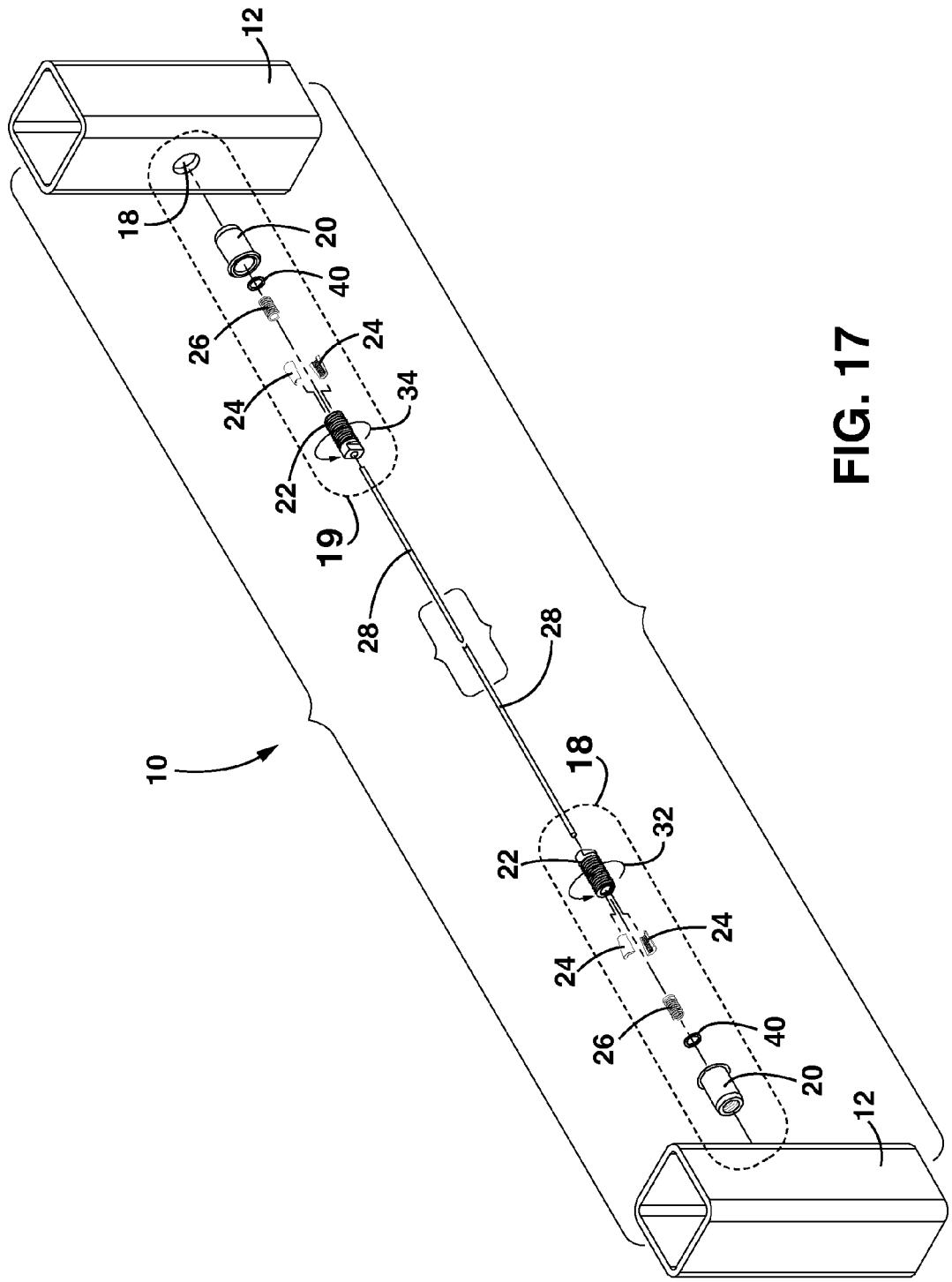
FIG. 17 is an exploded perspective view of FIG. 2.
Figure 18:
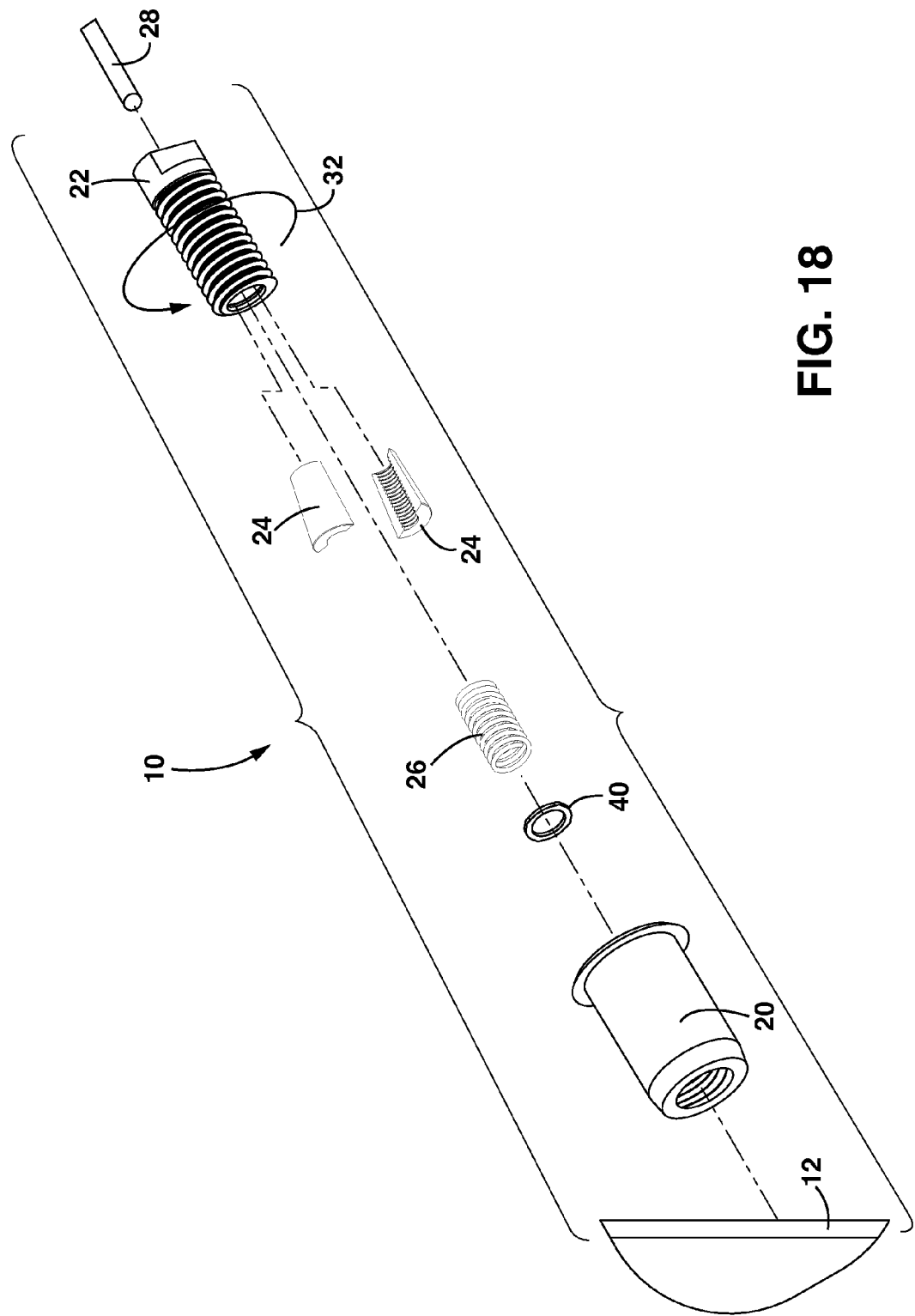
FIG. 18 is a detail view taken from FIG. 17.
Figure 19:
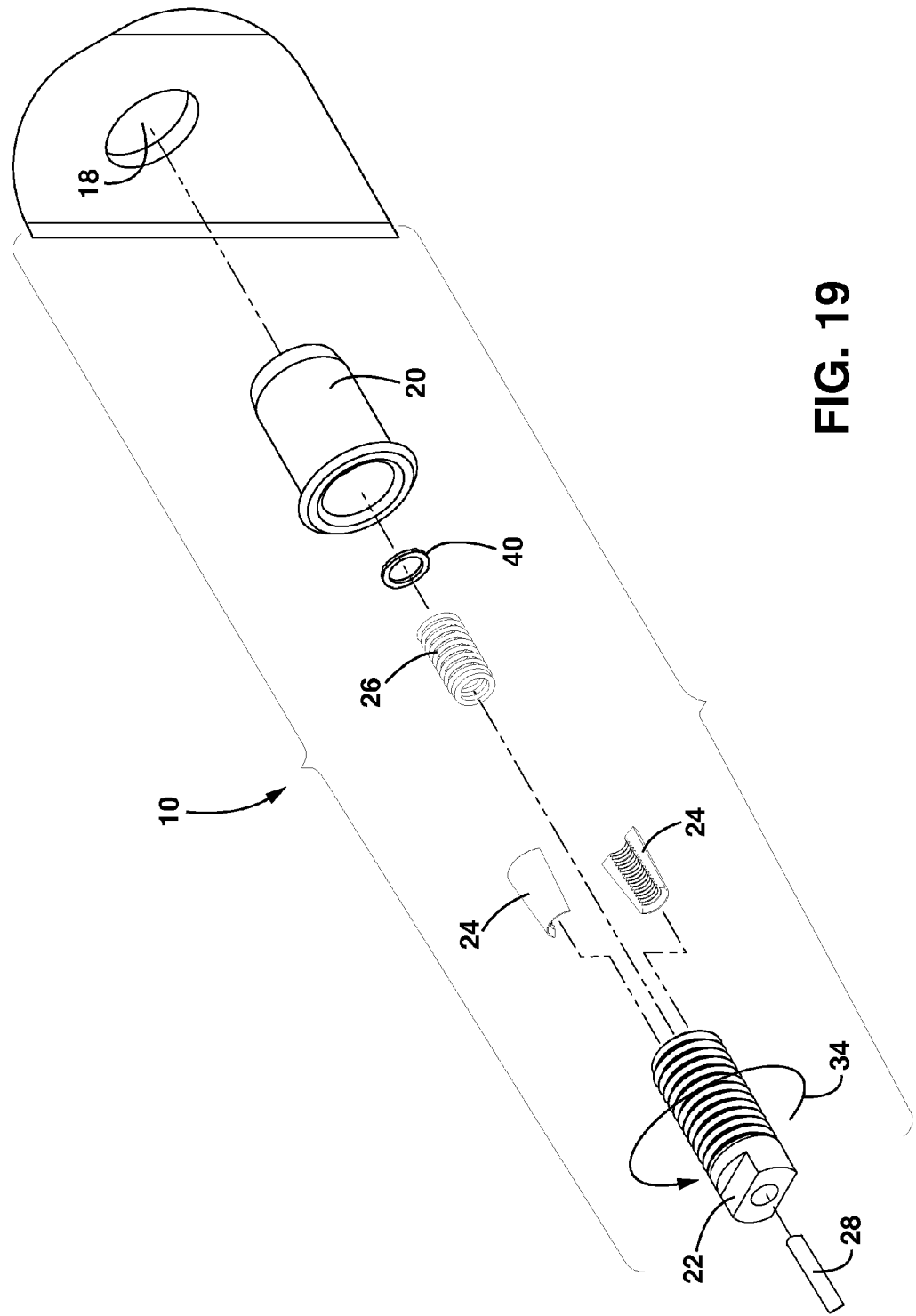
FIG. 19 is a detail view taken from FIG. 17.

Referring now to FIG. 17 through FIG. 19. FIG. 17 is an exploded perspective view of FIG. 2. FIG. 18 is a detail view taken from FIG. 17. FIG. 19 is a detail view taken from FIG. 17. The sequence of drawings FIG. 17 through FIG. 19 illustrates the assembly order of cable railing 10 in an exploded diagram. At least two vertical members 12 are provided. At least one hole 18 is drilled through the inside facing wall of each vertical member 12. The holes 18 are approximately 0.75 inches in diameter. The holes 18 accommodate the insertion of receiving insert 20. After insertion, receiving insert 20 is permanently affixed, in hole 18, by a setting tool which secures receiving insert 20 to the inside and outside surfaces of the tube wall adjacent to hole 18. The next step in the assembly is the insertion of at least two wedge locks 24 and one spring 26 into the hollow cavity of each threaded insert 22. Threaded insert 22 is then threaded into the inside thread of each receiving insert 22 and tightened to securely engage threaded insert 22 and receiving insert 20. Next, pre-cut cable 28 is installed into the outside facing access holes of threaded inserts 22. Any slack in the cable 28 is removed by hand and the cable 28 is drawn taught by turning one threaded insert 22 (shown to the left in the illustrations) in a clockwise rotation 32 and the opposite threaded insert 22 (shown to the right in the illustrations) in a counter clockwise rotation 34. The tightening of the threaded insert 22 causes the tapered inside surface of the threaded insert 22 to act against the tapered outside surface of the wedge lock pair 24 to apply clamping pressure to the cable 28. This clamping pressure maintains the tension in the cable 28 as the threaded inserts 22 are threaded into the receiving insert 20.

Figure 21:
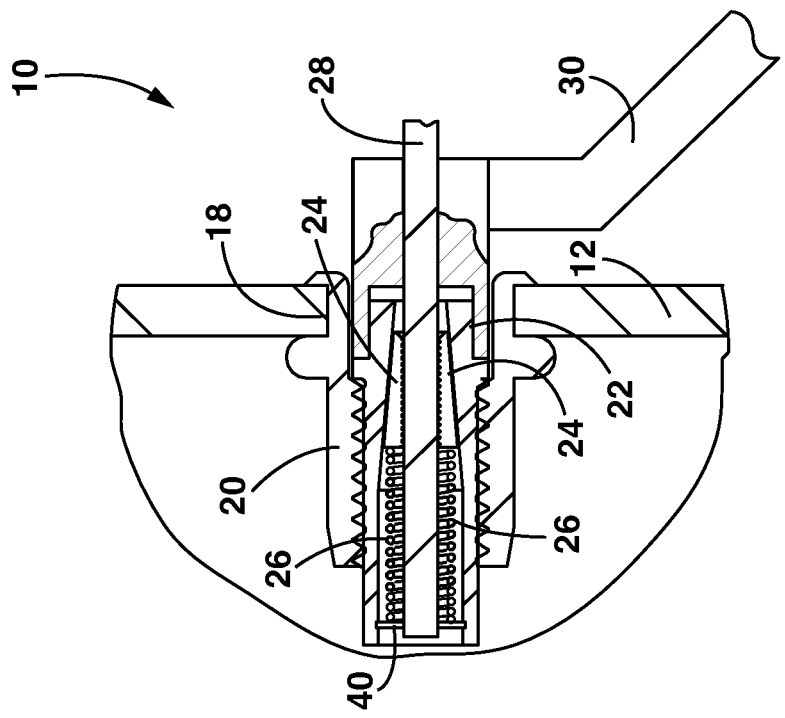
FIG. 21 is a front section view like FIG. 6 with a tightening means in use.
Figure 20:
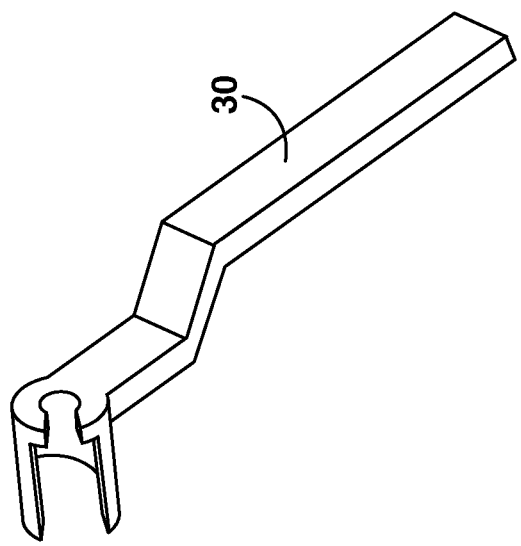
FIG. 20 is a perspective view of the tightening means.

FIG. 20 is a perspective view of the tightening means 30. The tightening means 30 is constructed of cast, forged or fabricated steel and is approximately 8 inches in length with an approximately 0.25 inch deep by 0.75 inch wide handle containing an articulated bend of approximately 45 degrees. The engagement end of tightening means 30 is cylindrical in fashion and constructed to fit the head of threaded insert 22 and gives clearance to rotate inside of receiving insert 20. FIG. 21 is a front section view like FIG. 6 with a tightening means 30 in use. In some installations it is preferable to not have the head of threaded insert 22 exposed beyond the inside surface of vertical member 12. In this instance traditional tools, such as wrenches and pliers cannot set the threaded insert 22 to this depth. Tightening means 30 is used to engage the head of threaded insert 22 and set it to a level below the inside surface of vertical member 12.

Figure 23:
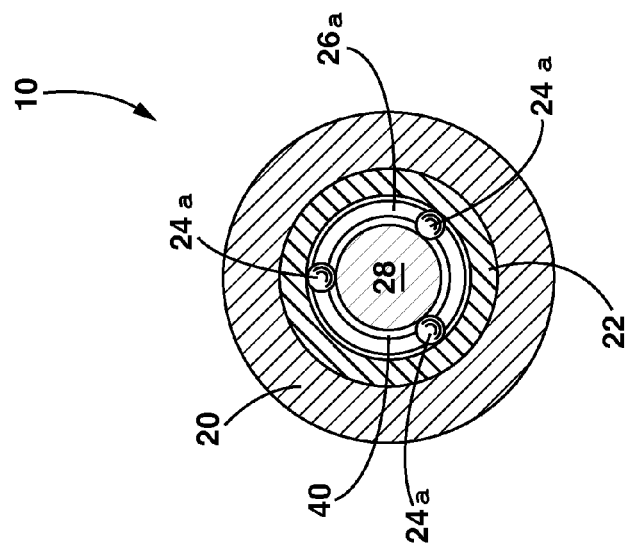
FIG. 23 is a section view taken from FIG. 22.
Figure 22:
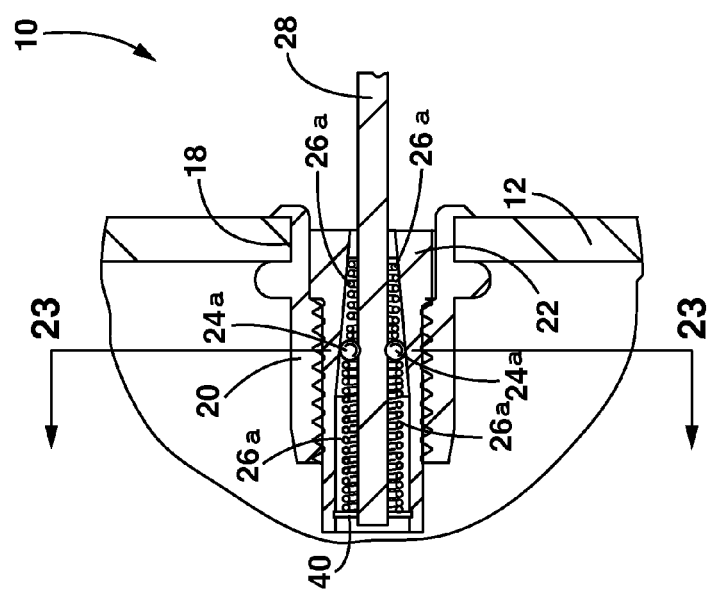
FIG. 22 is a section view of another embodiment of the wedge lock.

FIG. 22 is a section view of another embodiment of the wedge lock 24a and FIG. 23 is a section view taken from FIG. 22. In this embodiment wedge lock 24a can be constructed as a steel sphere. A plurality of steel spheres are positioned to center cable 28 with in threaded insert 22. Two springs 26a may be used in this embodiment to apply opposing forces to hold wedge locks 24a in a planer position inside threaded insert 22. The spheres may be held in place in a circular carrier having a variable diameter, which allows the diameter of the carrier to decrease as the carrier is pushed toward the front end of the assembly within the tapered section of the threaded insert 22. Cable 28 is inserted and held by pressure from the wedge locks 24.

While the foregoing invention has been described in some detail for purposes of clarity and understanding, it will be appreciated by one skilled in the art, from a reading of the disclosure, that various changes in form and detail can be made without departing from the true scope of the invention.

What is claimed is:

1. A railing system comprising:
a pair of tubular vertical members, each having at least one wall with an inside surface and an outside surface, the inside surface of the at least one wall defining a cavity within the tubular member;
a pair of cable receiving assemblies, each cable receiving assembly attached to one of the pair of vertical members and having a cavity therein with an outwardly facing opening for receiving a cable; and
a cable having opposed ends, wherein each of the opposed ends is inserted into one of the outwardly facing openings and at least one of the opposed ends is terminated in one of the pair of cable receiving assemblies,
wherein at least one of the pair of cable receiving assemblies comprises:
a tubular receiving insert having an inside terminal end with an opening therein, an outside terminal end with an opening therein, a tubular threaded portion having inner threads between the inside and outside terminal ends of the tubular receiving insert, and a tubular non-threaded portion beginning at an outward end of the first tubular threaded portion and terminating at the outside terminal end of the tubular receiving insert, the tubular receiving insert permanently affixed at the outside terminal end to the at least one wall of at least one of the vertical members such that the inside terminal end and at least a portion of the inner threads of the tubular receiving member are located within the cavity of the tubular member,
a tubular threaded insert having a first terminal end with an opening therein, a second terminal end with an opening therein, a first portion having outer threads between the first and second terminal ends of the threaded insert, a second non-threaded portion with a head thereon at the second terminal end of the threaded insert, and a tapered inner surface at the second terminal end of the threaded insert, the tubular threaded insert threaded into the receiving insert such that the first terminal end and at least a portion of the outer threads of the tubular threaded insert are located within the cavity of the tubular member, the head having a plurality of opposing planer surfaces that accommodate a tool for threading the threaded insert into the receiving insert, and
at least two wedge locks inserted within the threaded insert, each of the wedge locks having a tapered outside surface that acts against the tapered inner surface of the threaded insert and at least one tension surface that clamps onto the cable inserted within the assembly; and
wherein the tubular threaded portion has a first diameter and the tubular non-threaded portion has a second diameter greater than the first diameter, therewith forming a shelf within the tubular receiving insert, and wherein the second non-threaded portion at the second terminal end of the threaded insert is dimensioned to prevent the tubular threaded insert from being threaded beyond the shelf.

2. The railing system of claim 1, wherein the tubular receiving insert comprises an outwardly extending protrusion between the inner and outer terminal ends of the receiving insert forming a first annular flange, and an outside portion at the outside terminal end of the receiving insert, and wherein the receiving insert passes through a hole in one of the vertical members such that the first flange abuts against the inside surface of the at least one wall of the vertical member and an expanded section of the outside portion of the receiving insert forms a second annular flange that abuts against the outside surface of the at least one wall, therewith affixing the receiving insert to the hole in the vertical member.

3. The railing system of claim 2, wherein the outside terminal end of the receiving insert fits essentially flush with the outer surface of the vertical member.

4. The railing system of claim 3, wherein the second annular flange of the tubular receiving insert fits essentially flush with the outer surface of the vertical member and wherein the head of the tubular threaded insert at the second terminal end of the tubular threaded insert is located within the tubular receiving insert such that the head does not extend beyond the second annular flange of the tubular receiving insert.

5. The railing system of claim 2, wherein at least one of the cable ends extends through the tubular receiving insert and terminates beyond the inside terminal end of the receiving insert.

6. The railing system of claim 1, the at least one cable receiving assembly comprising a spring that pushes the at least two wedge locks outward.

7. The railing system of claim 6, wherein the spring is a coil spring and wherein the cable is located within the coil spring.

8. The railing system of claim 1, wherein threading the threaded insert increases a tension in the cable.

9. The railing system of claim 1, wherein the threads of the receiving insert of one of the assemblies is opposite the threads of the receiving insert of another of the assemblies.

10. The railing system of claim 9, wherein each cable receiving assembly comprising a spring that pushes the at least two wedge locks outward.

11. The railing system of claim 9, wherein the spring is a coil spring and wherein the cable is located within the coil spring.

12. The railing system of claim 1, each of the wedge locks having a spherical shape that acts against the tapered inner surface of the threaded insert to clamp onto the cable inserted within the assembly.

13. The railing system of claim 1, wherein at least one of the cable ends extends through the tubular receiving insert and terminates beyond the inside terminal end of the receiving insert.

* * * * *